(12) United States Patent
Koren et al.

(10) Patent No.: US 7,675,851 B2
(45) Date of Patent: Mar. 9, 2010

(54) SYSTEM AND METHOD FOR SYNCHRONIZING A BACK-UP DEVICE IN A COMMUNICATIONS ENVIRONMENT

(75) Inventors: Tmima Koren, Cupertino, CA (US); Jagdish V. Sonti, Cupertino, CA (US); Walter L. Robinson, Raleigh, NC (US); Nathan A. Mitchell, Siler City, NC (US)

(73) Assignee: Cisco Technology, Inc., San Jose, CA (US)

( * ) Notice: Subject to any disclaimer, the term of this patent is extended or adjusted under 35 U.S.C. 154(b) by 1148 days.

(21) Appl. No.: 11/281,974

(22) Filed: Nov. 16, 2005

(65) Prior Publication Data

US 2007/0109959 A1    May 17, 2007

(51) Int. Cl.
*H04J 3/14* (2006.01)
*H04L 12/56* (2006.01)
(52) U.S. Cl. .................. 370/218; 370/389; 370/338
(58) Field of Classification Search .................. 370/218, 370/389, 217, 328, 338, 220, 219
See application file for complete search history.

(56) References Cited

U.S. PATENT DOCUMENTS

| 5,894,557 | A | 4/1999 | Bade et al. ............. 395/200.58 |
|---|---|---|---|
| 6,134,245 | A | 10/2000 | Scarmalis .................. 370/474 |
| 6,148,410 | A * | 11/2000 | Baskey et al. ................... 714/4 |
| 6,192,051 | B1 | 2/2001 | Lipman et al. .............. 370/389 |
| 6,363,065 | B1 | 3/2002 | Thornton et al. ............ 370/352 |
| 6,400,722 | B1 | 6/2002 | Chuah et al. ................. 370/401 |
| 6,477,595 | B1 | 11/2002 | Cohen et al. ................. 710/105 |
| 6,512,754 | B2 | 1/2003 | Feder et al. ................. 370/338 |
| 6,512,773 | B1 | 1/2003 | Scott ..................... 370/395.61 |
| 6,515,665 | B1 * | 2/2003 | Ross .......................... 345/440 |
| 6,735,169 | B1 * | 5/2004 | Albert et al. ................. 370/229 |
| 7,076,016 | B1 * | 7/2006 | Cole et al. ................... 375/377 |
| 7,248,560 | B1 * | 7/2007 | Blankenship et al. ........ 370/220 |
| 7,289,433 | B1 * | 10/2007 | Chmara et al. .............. 370/219 |
| 2006/0098665 | A1 * | 5/2006 | Quick ......................... 370/401 |

* cited by examiner

*Primary Examiner*—Brian D Nguyen
(74) *Attorney, Agent, or Firm*—Baker Botts L.L.P.

(57) ABSTRACT

An apparatus for communicating data is provided that includes a cell site element associated with a base transceiver station and comprising a compression module that is operable to receive a plurality of bits associated with a communications flow, to inspect the bits, to determine whether one or more samples included in the flow should be suppressed, and to compress the samples. The cell site element is coupled to a back-up device that is operable to assume responsibility for active flows in a case where a primary device fails. Data is exchanged between the primary device and the back-up device, the data guiding the back-up device in how to process the active flows.

27 Claims, 3 Drawing Sheets

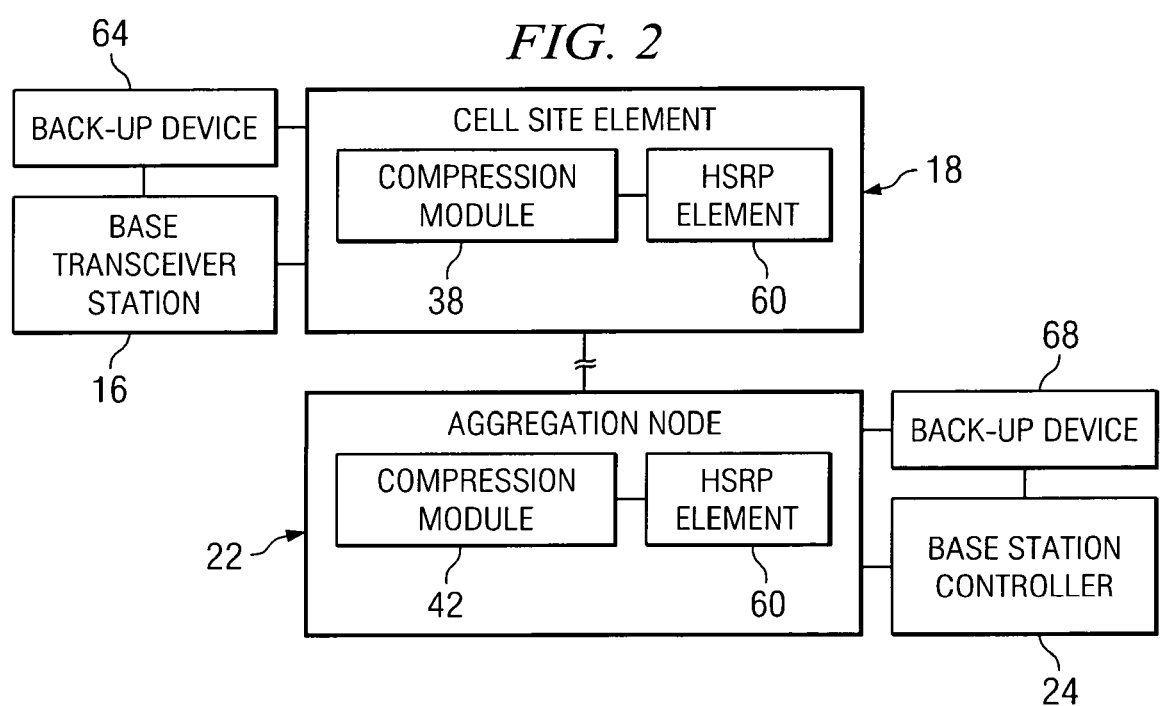

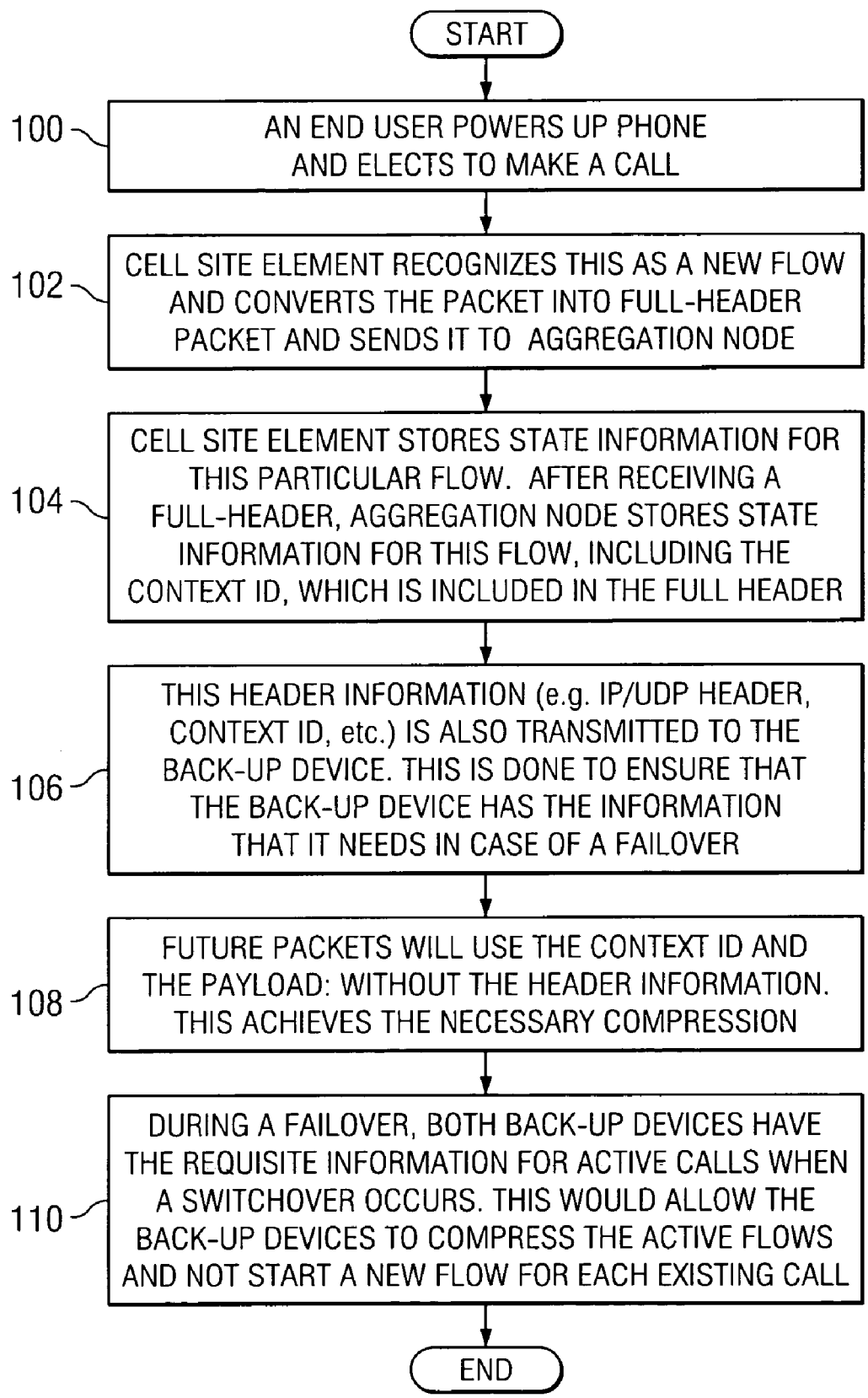

SYSTEM AND METHOD FOR SYNCHRONIZING A BACK-UP DEVICE IN A COMMUNICATIONS ENVIRONMENT

TECHNICAL FIELD OF THE INVENTION

The present invention relates in general to the field of communications and, more particularly, to a system and a method for synchronizing a back-up device in a communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges can add significant overhead and cost in order to accommodate a large number of end-users or data streams. For example, a large number of T1/E1 lines may be used to accommodate heavy traffic, but such lines are generally expensive and, thus, usage of each one should be maximized (to the extent that it is possible) in order to achieve a system benefit per-unit of cost.

Compression techniques can be used by network operators to produce high percentages of bandwidth savings. In certain scenarios, network operators may consider compressing certain communication patterns that appear on a given communication link. However, many of the existing compression/suppression protocols are problematic in the case of failover. During a failover situation, full-headers can flood either the cell site location or the aggregation node location. This overwhelms any device residing at these locations. This flooding causes oversubscription of the communication link [e.g. a T1 link] and results in a substantial number of packets and/or calls being dropped.

Accordingly, the ability to provide a communications system that consumes few resources, optimizes bandwidth, and properly addresses failover scenarios presents a significant challenge for network operators, service providers, and system administrators.

SUMMARY OF THE INVENTION

From the foregoing, it may be appreciated by those skilled in the art that a need has arisen for an improved compression approach that addresses failover scenarios in a communications environment. In accordance with one embodiment of the present invention, a system and a method for synchronizing a back-up device are provided that substantially eliminate or greatly reduce disadvantages and problems associated with conventional compression/suppression techniques.

According to one embodiment of the present invention, an apparatus for communicating data is provided that includes a cell site element associated with a base transceiver station and comprising a compression module that is operable to receive a plurality of bits associated with a communications flow, to inspect the bits, to determine whether one or more samples included in the flow should be suppressed, and to compress the samples. The cell site element is coupled to a back-up device that is operable to assume responsibility for active flows in a case where a primary device fails. Data is exchanged between the primary device and the back-up device, the data guiding the back-up device in how to process the active flows.

In more specific embodiments, the cell site element includes an internal routing protocol element that can be leveraged in order to deliver the data from the primary device to the back-up device. The internal routing protocol element can be either a hot standby router protocol (HSRP) element or a virtual router redundancy protocol (VRRP) element, or any other suitable signaling platform.

Certain embodiments of the present invention may provide a number of technical advantages. For example, according to one embodiment of the present invention, a communications approach is provided that achieves minimum congestion during a failover. This is a result of the synchronization between a primary device and a back-up device in the architecture. More importantly, the present invention reduces the number of packets that are lost and/or calls that are dropped. This performance advantage is critical to efficiency on the backhaul. Hence, by using the system outlined by the present invention, active calls are effectively preserved in the case of failover.

It should also be noted that a minimum bandwidth usage for context transfer is also offered by the present invention. Moreover, the transfer is performed on links that are not necessarily sensitive to bandwidth usage. Additionally, the architecture of the present invention offers a degree of protection against flow corruption, which is further detailed below.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIG. 2 is a block diagram of an example internal structure associated with a cell site element and/or an aggregation node of the communication system; and FIG. 3 is a simplified flowchart associated with an example flow of the communication system.

DETAILED DESCRIPTION OF THE INVENTION

Figure 1:
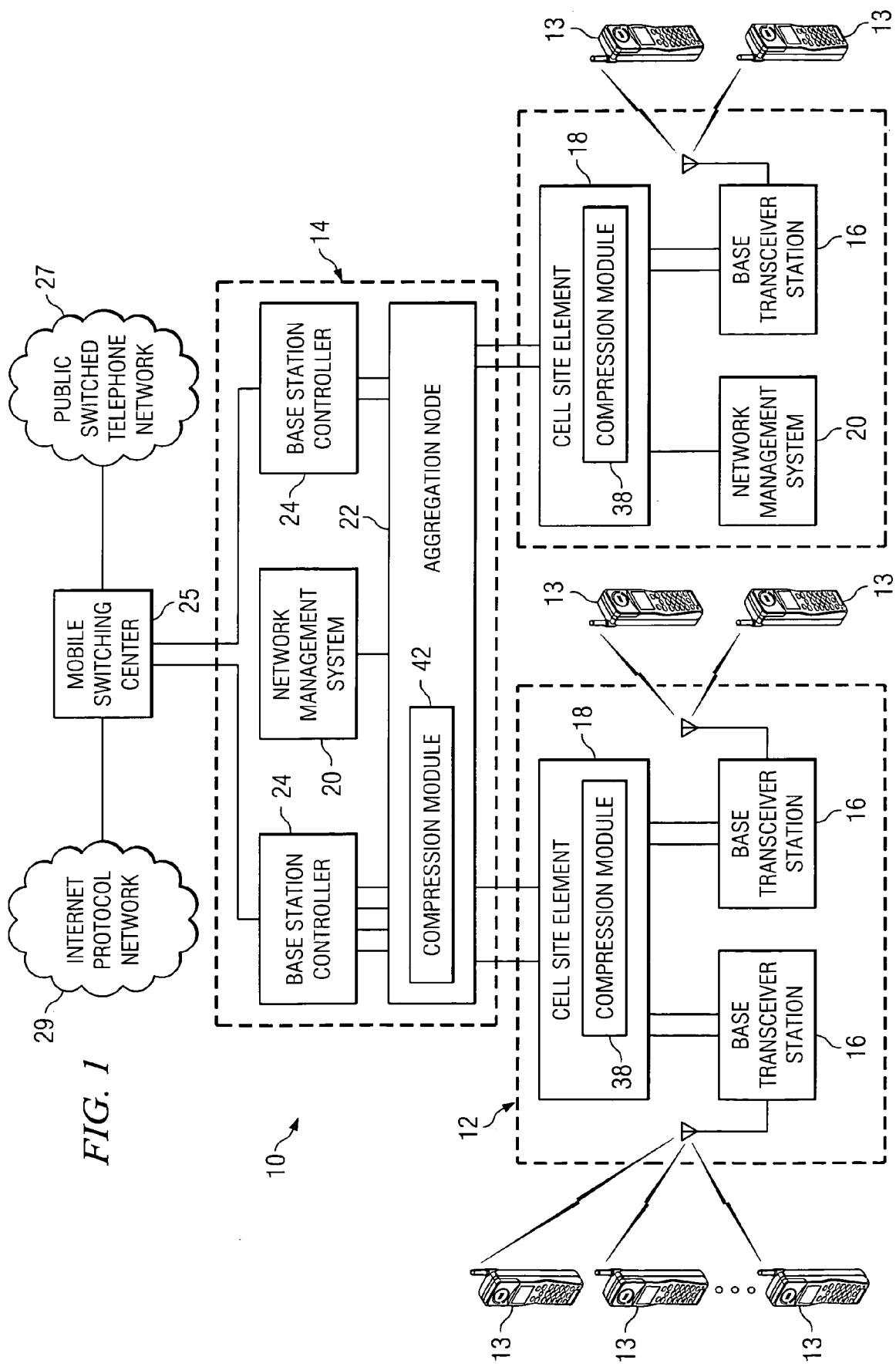
FIG. 1 is a simplified block diagram of a communication system for synchronizing data in a network environment.

FIG. 1 is a simplified block diagram of a communication system 10 for compressing data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Each cell site element 18 and aggregation node 22 may include a compression module 38 and 42 respectively.

Note the communications links extending between cell site element 18 and aggregation node 22, as compared to the number of communication links extending between cell site element 18 and base transceiver stations 16. This arrangement has been provided in order to illustrate the compression techniques, which may be used in conjunction with the present invention.

Communication system 10 may generally be configured or arranged to represent 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain. Hence, the present invention is malleable, as it can be used in various networking arrangements (CDMA IP-RAN, GSM/UMTS RAN-O, etc.).

As illustrated in FIG. 1, in a GSM network, a backhaul network exists between a BTS and a BSC. The backhaul can be used to transmit voice conversations, data, and control information using various standards and proprietary vendor specific formats. In order to address operational expenses, a backhaul optimization scheme is implemented to provide significant bandwidth savings, while maintaining low latency and end-to-end transmissions for all possible frame types.

There are normally two devices (e.g. routers) in a backhaul configuration: both at the cell site and the aggregation node. (The back-up arrangement is illustrated by FIG. 2 and described in greater detail below.) The two devices can offer failover protection if one of the primary devices happens to fail. A problem arises due to the compression protocols that are constantly running in the backhaul. The compression protocol uses context IDs (also referred to as CIDs), which must be accounted for during a failover. If the contexts IDs are not accounted for, the architecture is vulnerable and susceptible to dropped calls or lost data. The intent of the present invention is to obviate the need to re-establish some of the active flows that are prevalent in the architecture.

RFC 2508 is designed to encode (within the initial packet) a flow to indicate that this is a full-header compressed packet, or a non-compressed packet. Hence, the first time a flow is set-up, this special full-header packet is sent. After this, only the context identifier is needed to be sent, along with a special header indicating that this is a compressed packet. The IP and UDP fields are regenerated at the other end because the other end has stored this information after receiving the full-header such that the other end knows how to regenerate this flow.

During a failover situation, a barrage of full-headers bombards the cell site. This overwhelms the device and causes oversubscription of the T1 link. This may result in a substantial number of packets and/or calls being dropped. The present invention operates to overcome these problems by passing information about the flows, which were set-up, between the active and the back-up devices. Thus, when a failover occurs, the standby device does not need to coordinate all of the full-headers to reestablish the flows. The standby device already knows the information that it needs. Additional details associated with these operations are provided below with reference to FIGS. 2 and 3.

Typically, the compression module within cell site element 18 or aggregation node 22 allows communication system 10 to suppress unused, idle, and redundant information in offering an optimal solution for the backhaul network. It also allows for the recreation of the comprised data at the peer device. These operations can be achieved in any suitable fashion.

Thus, an incoming bit pattern may be evaluated to determine whether it can be suppressed. A bit pattern can be played out or restored on the opposite end of the communication link to mimic the data in cases where the frame is designated for suppression. The restoration function includes suitable ordering and timing operations. This recognition (of compressible streams) would allow the greatest savings for any compression operation. In cases where the incoming pattern is not a candidate for suppression, the entire bit pattern could then be sent, as the architecture would be unable to suppress all of the diverse bit patterns in a given backhaul with fewer bits. A demultiplexer, which can be suitably positioned downstream, may then simply perform a series of reverse operations in identifying the suppressed information and playing out the data.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

It can be appreciated that circuit switched data is generally present on the backhaul and the challenge is to convert that into packet switched data such that additional IP traffic can be added to this data. This could maximize the bandwidth available on the backhaul. From another perspective, the bandwidth required to support the circuit switched data should be reduced where possible.

A number of time slots (e.g. within a T1/E1) are often idle or unused. Other patterns may include repetitive voice data, silence data, user data, or control data. Recognizing this inefficiency allows some of this idleness to be eliminated, as the only information that should be propagating along the backhaul is information that is unique (i.e. cannot be recreated at aggregation node 22). Other insignificant data segments (e.g. silence, certain control information, etc.) can similarly be accounted for and eliminated from the traffic flows to produce an increase in available bandwidth. The following are candidates for suppression (i.e. not transmitted over a given IP E1 from BTS site to BSC site): 1) idle/unallocated time slots; 2) idle TRAU; 3) silence TRAU; 4) error sub-rate/channel; 5) HDLC idle (repeating 7E flags); and 6) GPRS idle/repeating PCU/CCU.

Hence, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between base transceiver station 16 and base station controller 24.

Turning to the infrastructure of FIG. 1, mobile station 13 may be used to initiate a communication session that may benefit from such a suppression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, various traffic protocols (e.g. time division multiplexed (TDM), GSM 8.60, GSM 8.61, high level data link control (HDLC), asynchronous transfer mode (ATM), point to point protocol (PPP) over HDLC, TRAU, vendor-specific formats, etc.) may be used and communicated by each base transceiver station 16 to cell site element 18 of cell site 12. Cell site element 18 may also receive IP or Ethernet traffic from network management system 20. Cell site element 18 may multiplex together payloads from the layer-two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any landline telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

FIG. 2 is a simplified block diagram of an example internal structure of cell site element 18 and aggregation node 22: both of which include a compression module 38 and 42 and a hot standby router protocol (HSRP) element 60. Additionally, each cell site element 18 and aggregation node 22 is coupled to a back-up device 64 and 68 respectively. HSRP is a Cisco proprietary routing protocol for fault-tolerant routing, which has been described in detail in RFC 2281. The virtual router redundancy protocol (VRRP) is a standards-based alternative to HSRP defined in IETF standard RFC 3768. Any such components, and other similar protocols, are included within the term "internal routing protocol" as used herein in this specification.

In one embodiment, a state machine (responsible for the synchronization function outlined herein) is used to interface with compression modules 38 and 42 and HSRP element 60 (which could also be a state machine and which addresses redundancy issues). HSRP element 60 is responsible for sending the requisite information to back-up devices 64 and 68 at both the aggregation node and the cell site element locations.

In one embodiment, compression modules 38 and 42 are algorithms (potentially included in appropriate software) that achieves the compressing operations as described herein. Compression modules 38 and 42, HSRP elements 60, and back-up devices 64 and 68 may be suitably coupled to each other, and thereby interface, in any appropriate fashion.

As identified above, in one embodiment, the synchronization component and the HSRP components are provided by a state machine provided at the cell site element location and the aggregation node location. In other embodiments, the synchronization components and the HSRP components are field programmable gate arrays (FPGAs). Alternatively, such operations and techniques may be executed by any suitable component, device, application specific integrated circuit (ASIC), software, processor, algorithm, erasable programmable read only memory (EPROM), electrically erasable programmable ROM (EEPROM), or any other suitable object that is operable to facilitate such operations. Considerable flexibility is provided by the structure of the synchronization and HSRP components. It can also be easily appreciated that such a function could be provided external to cell site element 18 and aggregation node 22. In such cases, such a functionality could readily be embodied in a separate component, element, or device.

As explained above, in an IP RAN transport solution (or other similar but more generic transport solutions), there are two peers to be accounted for along the backhaul. Both cell site element 18 and aggregation node 22 are deployed in a redundant fashion. The exact method of redundancy may vary from one deployment/solution to another. In a typical IP RAN deployment, the protocol stack is as follows: UDP/IP/MLPPP/T1-E1. cUDP header compression (identified in RFC 2508) is utilized to achieve bandwidth savings. For each direction, compression module 38 and 42 at one end performs compression, and the decompressor at the peer performs decompression. When a flow starts, the compressor selects a context ID and sends it across to the peer embedded in a full header packet. Thereafter, the compressor replaces UDP/IP headers with the context ID and, thereby, saves bandwidth across the links. When a flow terminates, the context is reused after an expiration interval.

During a potential cell site failover, the PPP link to the aggregation node is brought down and a new PPP session is established with the newly active component (i.e. the back-up device). In conventional systems, all compression contexts are lost, so all of the ongoing calls must restart compression. All streams will have to send full header packets, which are large (and links have not been provisioned to handle this amount of traffic), and, subsequently, the PPP link will become congested. Link utilization above 30-40% at the time of failover would result in severe congestion and it will be difficult to preserve any calls because a large number of packets will be dropped. Additionally, under those circumstances, the benefits of a sub 5-second failover required to keep calls active will be lost. The situation causes such severe congestion that most calls will be lost.

Hence, the present invention recognizes that it is useful to preserve the cUDP compression contexts (both at the cell site location and the aggregation node location) so that the new PPP link can continue where the old one left with minimal disruption to ongoing calls. The present invention proposes a context transfer mechanism, whereby the contexts are transferred to the newly active device.

Initially, it should be understood what is in a context and, further, what changes after initial context selection from packet to packet within a stream/flow. The context can include: CID, IP source/dest, TOS, TTL, UDP source/dest, expiration time, etc. With no IP ID, the only parameter that changes in a cUDP context for a stream is the expiration time parameter. Using a synchronization component (e.g. by leveraging HSRP element 60 or any other type of signaling or data transfers), the active or primary device can update the standby or back-up device about new contexts, expired contexts, and changes in expiration time. For a new context, the CID, IP, UDP header fields, and expiration time can be communicated to the standby router. For expiration time updates, the CID and new expiration time can be sent to the standby device. For expired contexts, the CID needs to be transferred.

Context corruption may occur when an update is lost. For example, if an update arrives updating the expiration time of a context that is already expired according to the current expiration time in the context, then this indicates that an update was lost. The update could have been a new expiration time for the old context, or a new assignment of this context to a new stream. In such cases, there should be a mechanism for the back-up device to request a full update (same as for a new context update) for a context. The context should stay in an expired state until the full update arrives. Within a primary device, the old active component (e.g. router) can constantly update the newly active device with context changes as described above, or send the context over as part of the failover procedure.

It is typical to connect the redundant devices using Eth/FE cables and using some form of redundancy protocol e.g. HSRP. The context transfer updates can be piggybacked on the HSRP messages exchanged by the primary devices periodically. (Other signaling could similarly be leveraged or proprietary signaling could be used.) This transfer can be done periodically at configured intervals and it also can be performed when a controlled failover is triggered.

At the aggregation node, when the multilink goes down, the cUDP context can be preserved and can be used either when the multilink is up again or upon request from the newly active device. Another option is that the newly active device can send the context to the aggregation node since the contexts at the compressor and decompressor are identical. The latter option requires use of additional bandwidth and is prone to message loss. This latter option is viable if the transfer of context from the cell site occurs before the packets arrive at the aggregation node in the downlink direction. The same mechanism can also be applied to a more generic way to MLP/PPP context transfer.

Hence, the present invention is used to offer a cUDP context transfer mechanism for redundant devices. The invention proposes a minimum set of context information that needs to be transferred for streams at various stages. Protocols that can be used to piggyback these context transfer messages are also offered by the present invention, as described above. Advantages of such a solution include minimum congestion during failover, minimum bandwidth usage for context transfer, and the exchange of data being performed on links that are not sensitive to bandwidth usage constraints. Such a system allows preservation for active calls during failover. Additionally, such a system provides protection against flow corruption.

Details concerning the exact data that propagate between a primary and a back-up device are provided for the audience. This discussion is only provided for purposes of teaching and, thus, should not be construed to limit the broad scope of the present invention. The following information should be sent to the standby device for each new flow (context) that begins, or when a full header is sent or received on a flow: 1) static fields of the IP header (ID and checksum fields are only non-static fields) [16 bytes]; 2) source, destination UDP ports [4 bytes]; and 3) context information: 1 or 2 byte CID, 1 byte state, 1 byte timeout (optional).

The IP ID field may optionally be sent since it is utilized in cUDP per RFC 2508. However, in one IP RAN implementation, the IP ID field is independently generated by the decompressor and no IP ID delta is transmitted across the backhaul in the compressed context. It should also be noted that trying to synchronize the IP ID field after a failover would be extremely difficult. This does not cause any operational problem since the IP ID is utilized for fragmented IP packets only, and those are not compressed.

The optional one-byte timeout is also unique in such an IP RAN implementation of cUDP. This is introduced to eliminate the flow corruption exposure that exists with RFC 2508. It should be noted that implementation of the timeout feature is optional for the present invention. The timestamp is in actuality a router based 4-byte timestamp that can be derived from a system clock. When communicating this to the standby device, the delta seconds to expiration (rather than the timestamp) may be passed. Attempting to keep the back-up device in tune with the delta time, either periodically or when a new packet is seen on a flow, may consume too much router CPU and network bandwidth to be feasible.

Instead of sending the timeout delta to the standby at all, upon failover, the newly active device can reset all timeouts to the default timeout value for all contexts in the compressor and decompressor components. To prevent flow corruption, the timeout values should match the timeout values at the remote end. The remote end can detect that the failover has occurred (e.g. by multilink going down and coming up, which is distinguished from the user intervention states such as admin down and up) and would similarly reset its timeouts to the default value as well.

Alternatively, the newly active device can send a message (such as a dummy context invalidate to the other end of the backhaul upon becoming active) and defaulting timestamps so that the other end can also default all timestamps. This ensures that both ends of the compression engine are coordinated with the contexts expiration time. This approach of restarting the timeout values keeps a few flows active that otherwise would have expired (an additional period equal to the default timeout value). This overhead needs to be taken into consideration while planning the CID configuration.

It is to be noted that at the aggregation end, the nodes may support n:1 redundancy instead of 1:1. In an n:1 case, all the active devices should update the standby device. During the failover, the newly active device needs to select the correct configurations and contexts to be used. The state byte indicates the size of the CID and whether a non-zero UDP checksum is present.

Whenever a context state message is sent or received, a message should also be sent to the standby to indicate this condition. It should be noted that when using the above IP ID enhancement, the context state messages are normally not sent, except when a compressed packet is received for a flow, which has expired at the decompressor. By eliminating the need of periodic update messages to the standby device for active flows as proposed, only a flow start and flow end message should be sent to the standby. A typical cell site device may have 200 or so active flows, or calls, per cell site device, whereby calls often last for minutes. Assuming a call time of 60 to 80 seconds (this is the typical call hold time), this would cause approximately 3 or so messages per-second between the active and back-up devices: causing minimal CPU or network load. If it were desirable to reduce the number of messages (this would be more attractive at the central site aggregation node where multiple cell sites are monitored by one aggregation node device), messages could be bundled and sent from the active to standby on a periodic rate based on the time and the number of messages that are ready to be sent.

In operation of a flow that highlights one example compression scenario, when the E1 frames come in from the wire, they are normally in a DS0 format. Compression module 38 is operable to divide the bits and then position the bits into the 16 kilo-bit samples. From this point, the IOS can then receive the samples and perform any number of comparison operations.

As the frames are coming in, compression module 38 can line-up bits into 16-bit registers such that they can be sent to IOS for compression operations to be performed. In addition to this task, compression module 38 can frame these bits as they arrive. Aside from transparently setting up the bits, compression module 38 can copy the bits and then evaluate the individual sub-rates. Thus, instead of evaluating single 8 kilo-bit sub-rates, these will be in pairs such that compression module 38 can evaluate sub-rates 0, 1 and then sub-rates 2, 3 and then sub-rates 4, 5. These two bits combined make up a 16 kilo-bit sub-rate.

These bits can then be assembled into a register. Once the bits are in the 16 kilo-bit register, compression module 38 can analyze this information and identify framing information for the 16 kilo-bit frame. In this scenario, compression module 38 may view the control bits in these frames. In particular, control bits 1-5 identify frame type and control bits 12, 13, and 14 are silence and SID information.

The functional flow of communication system 10 may follow a bits in/bits out protocol, being dependent only on the received bit pattern. Input DS0s may be demultiplexed to create an appropriate number of sub-rate DS0s, each corresponding to a different call. (Note that some DS0s are not assigned to any call and still others are used for control information.) For each sub-rate DS0, a certain portion (e.g. two milliseconds) of samples may be collected synchronously. Because the corresponding inputs are time-division multiplexed (TDM) streams, the collection operation should be completed at roughly the same time. For sixteen kilobits/sec multiplexing, this results in a collection of four bytes of data from each stream at about the same time.

Decisions may be made regarding which bits are to be suppressed with a corresponding header representing that the data has been suppressed. The receiving end may then perform reverse operations in accounting for the suppression in order to restore the bit stream and, potentially, to then communicate it to its intended next destination. Thus, a demultiplexer/decompressor (not shown) may perform tasks in reverse in order to undo what was done by the compressor and the multiplexer, which can be included within aggregation node 22 and/or cell site element 18.

TDM streams may be TDM multiplexed to generate appropriate DS0s, which are further combined with drop-and-insert DS0s to create T1/E1s. Based on the header of the overall multiplexed packet, appropriate line conditions or alarms may be generated at the output T1/E1 interface. Note that in order to increase robustness in the presence of errors, it is possible to protect payload header bits by a forward error correcting code and dropping the cyclic redundancy check (CRC) from point to point protocol (PPP) frames. An example of a simple error correcting method could be a table-based parity method, which can correct all one-bit errors.

It is critical to note that compression module 38 and 42 may be changed considerably, as it offers only one example compression protocol configuration that accommodates traffic on the backhaul. Any number of alternative compression protocols may be readily accommodated by communication system 10 and are, therefore, included in the broad scope of its teachings. These compression protocols may be based on particular communication needs in a given communications architecture.

Before turning to FIG. 3, it is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element that is operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein. In a similar vein, the terms "suppression" and "compression" are somewhat interchangeable. The two terms refer to operations that offer the ability to minimize data propagation along the backhaul. Both suppression and compression relate to abbreviating or eliminating certain portions of data segments, which are prevalent in the network.

As identified above, each of these elements may include software and/or an algorithm and/or an FPGA and/or a state machine (e.g. provided in compression module 38 and 42 and/or HSRP elements 60) to effectuate redundancy and compression for voice or packet data applications as described herein. Alternatively, such operations, decisions, and techniques may be achieved by any suitable hardware, component, device, ASIC, additional software, processor, algorithm, EPROM, EEPROM, or any other suitable object that is operable to facilitate such operations. Considerable flexibility is provided by the structure of cell site element 18 and aggregation node 22 (as well as their ancillary components) in the context of communication system 10. Thus, it can be easily appreciated that such functions could be provided external to cell site element 18 and aggregation node 22. In such cases, such functionalities could be readily embodied in a separate component, device, or module.

FIG. 3 is simplified flowchart, which illustrates one example associated with communication system 10. The flow begins at step 100, where an end user powers up a phone and elects to make a call. This would establish the UDP/IP flow that would propagate to cell site element 18. Cell site element 18 recognizes this as a new flow and would subsequently convert the packet into a full-header packet and send it to aggregation node 22. This is illustrated by step 102. Cell site element 18 will also store state information for this particular flow. In receiving a full-header, aggregation node 22 stores state information for this flow, including the context ID, which is included in the full header. This is illustrated by step 104.

Concurrently, the present invention will replicate this information (e.g. IP/UDP header, context ID, etc.) and/or transmit this header information to the back-up device at step 106. This is done to ensure that the back-up device has the information that it needs in case of a failover. This signaling, which provides appropriate redundancy, can be performed at both the cell site location and the aggregation node location.

Now, the flow is effectively set-up in both the back-up device and the primary device. Future packets will use the context ID and the payload without the header information. This achieves the necessary compression. This is illustrated by step 108. During a failover, both back-up devices have the requisite information for active calls when a switchover occurs. This would allow the back-up devices to compress the active flows (i.e. when the back-up device sees packets for those flows, it can send the packets in a compressed format) and not start a new flow for each call, as is illustrated by step 110. A new flow would spawn a re-transmission of the full-header information, which may in turn oversubscribe the communication link. Hence, the flooding of traffic at either the aggregation node location or the cell site location is effectively avoided.

It should be noted that some of the steps discussed in the preceding FIGURES may be changed or deleted where appropriate and additional steps may also be added to the process flows. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing, compression, and suppression techniques. In addition, any of the described elements may be provided as separate external components to communication system 10 or to each other where appropriate. The present invention contemplates great flexibility in the arrangement of these elements as well as their internal components.

In addition, although the preceding description offers a compression protocol and a synchronization protocol to be implemented with particular devices (e.g., aggregation node 22 and cell site element 18), the compression/synchronization protocol provided may be embodied in a fabricated module that is designed specifically for effectuating the techniques discussed above. Moreover, such a module may be compatible with any appropriate protocol, other than those discussed herein, which were offered for purposes of teaching and example only. Additionally, HSRP or VRRP are only suggestions on how to transfer the context to the standby device, but any other method can be used and, thus, is within the broad scope of the present invention.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus for communicating data, comprising:
a cell site element associated with a base transceiver station and comprising a compression module operable to:
receive a plurality of bits associated with a communications flow at the cell site element;
determine that a back-up device coupled to the cell site element is storing a full header of the communications flow, the back-up device operable to assume responsibility for one or more active flows if a primary device fails;
in response to the determination, designate one or more samples of the flow to be compressed;
compress the designated one or more samples by sending a compressed packet comprising a special header indicating that the packet is compressed, the compressed packet omitting non-context identification information, the primary device and the back-up device exchanging data, the data guiding the back-up device in how to process the active flows.

2. The apparatus of claim 1, wherein the cell site element includes an internal routing protocol element that is leveraged in order to deliver the data from the primary device to the back-up device.

3. The apparatus of claim 2, wherein the internal routing protocol element is either a hot standby router protocol (HSRP) element or a virtual router redundancy protocol (VRRP) element.

4. The apparatus of claim 1, wherein the data comprises context information.

5. The apparatus of claim 1, wherein the data comprises static fields of an IP header and information relating to source and destination ports.

6. The apparatus of claim 1, wherein the data comprises a timestamp based on a system clock.

7. The apparatus of claim 6, further comprising:
an aggregation node associated with a base station controller and operable to communicate with the cell site element and to receive the compressed samples.

8. The apparatus of claim 1, wherein the samples are received and evaluated in order to restore a plurality of bits associated with the compressed samples.

9. The apparatus of claim 1, wherein the primary device and the back-up device are a selected one of a group of devices, the group consisting of:
a) a router;
b) a switch;
c) a gateway; and
d) a load balancer.

10. The apparatus of claim 1, wherein one or more timeouts associated with the data are reset instead of being updated.

11. The apparatus of claim 1, the non-context identification information comprising at least one of the following types of information:
a) an idle/unallocated time slot;
b) an idle TRAU;
c) a silence TRAU;
d) an error sub-rate/channel;
e) a HDLC idle; or
f) a GPRS idle/repeating PCU/CCU.

12. A method for communicating data, comprising:
receiving a plurality of bits associated with a communications flow at a cell site element;
determining that a back-up device coupled to the cell site element is storing a full header of the communications flow, the back-up device operable to assume responsibility for one or more active flows if a primary device fails;
in response to the determination, designating one or more samples of the flow to be compressed;
compressing the designated one or more samples by sending a compressed packet comprising a special header indicating that the packet is compressed, the compressed packet omitting non-context identification information; and
exchanging data between the primary device and the back-up device, the data guiding the back-up device in how to process the active flows.

13. The method of claim 12, further comprising:
leveraging an internal routing protocol element in order to deliver the data from the primary device to the back-up device.

14. The method of claim 13, wherein the internal routing protocol element is either a hot standby router protocol (HSRP) element or a virtual router redundancy protocol (VRRP) element.

15. The method of claim 12, wherein the data comprises context information.

16. The method of claim 12, wherein the data comprises static fields of an IP header and information relating to source and destination ports.

17. The method of claim 12, wherein the data comprises a timestamp based on a system clock, and wherein one or more timeouts associated with the data are reset instead of being updated.

18. The apparatus of claim 12, further comprising:
receiving samples; and
restoring a plurality of bits associated with the compressed samples.

19. The method of claim 12, the non-context identification information comprising at least one of the following types of information:
a) an idle/unallocated time slot;
b) an idle TRAU;
c) a silence TRAU;
d) an error sub-rate/channel;
e) a HDLC idle; or
f) a GPRS idle/repeating PCU/CCU.

20. A computer readable medium encoded with software for communicating data, the software comprising computer code that when executed is operable to:
receive a plurality of bits associated with a communications flow at a cell site element;
determine that a back-up device coupled to the cell site element is storing a full header of the communications flow, the back-up device operable to assume responsibility for one or more active flows if a primary device fails;
in response to the determination, designate one or more samples of the flow to be compressed; compress the designated one or more samples by sending a compressed packet comprising a special header indicating that the packet is compressed, the compressed packet omitting non-context identification information; and
exchange data between the primary device and the back-up device, the data guiding the back-up device in how to process the active flows.

21. The medium of claim 20, wherein the code is further operable to:
leverage an internal routing protocol element in order to deliver the data from the primary device to the back-up device.

22. The medium of claim 21, wherein the internal routing protocol element is either a hot standby router protocol (HSRP) element or a virtual router redundancy protocol (VRRP) element.

23. The apparatus of claim 20, wherein the data comprises context information.

24. The medium of claim 20, wherein the data comprises static fields of an IP header and information relating to source and destination ports.

25. The medium of claim 20, wherein the data comprises a timestamp based on a system clock.

26. The medium of claim 20, wherein the code is further operable to:

receive the samples; and restore a plurality of bits associated with the compressed samples.

27. The medium of claim 20, the non-context identification information comprising at least one of the following types of information:

a) an idle/unallocated time slot;
b) an idle TRAU;
c) a silence TRAU;
d) an error sub-rate/channel;
e) a HDLC idle; or
f) a GPRS idle/repeating PCU/CCU.

* * * * *